United States Patent
Benson, Jr.

(10) Patent No.: US 6,507,827 B1
(45) Date of Patent: Jan. 14, 2003

(54) ADAPTIVE AND INTELLIGENT MODEM

(75) Inventor: Robert A. Benson, Jr., Saunderstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/443,241

(22) Filed: Nov. 16, 1999

(51) Int. Cl.[7] .............................. G06F 15/18; H04B 1/38
(52) U.S. Cl. ........................................... 706/14; 375/222
(58) Field of Search ............................ 706/14; 375/222

(56) References Cited

U.S. PATENT DOCUMENTS

| | | | |
|---|---|---|---|
| 5,633,890 A | * | 5/1997 | Ahmed ........................ 375/219 |
| 5,953,374 A | * | 9/1999 | Yeh .............................. 375/242 |
| 6,236,676 B1 | * | 5/2001 | Shaffer et al. ............... 375/222 |

OTHER PUBLICATIONS

Wong et al, "Upper–Bound Performance of a Wideband Burst–By–Burst Adaptive Modem", IEEE 49th Vehicular Technology Conference, May, 1999.*

* cited by examiner

Primary Examiner—George B. Davis
(74) Attorney, Agent, or Firm—Michael J. McGowan; Michael F. Oglo; James M. Kasischke

(57) ABSTRACT

A modem to improve communication system performance that uses multiple modulation schemes comprising modulation technique and encoder combinations. As communication system performance and objectives change, different modulation schemes may be selected. Modulation schemes may also be selected upon the communication channel scattering function estimate, and the modem estimates the channel scattering function from measurements of the channel's frequency (doppler) and time (multipath) spreading characteristics.

18 Claims, 2 Drawing Sheets ations Ser. No. 09/443,242.

ADAPTIVE AND INTELLIGENT MODEM

CROSS-REFERENCE TO RELATED APPLICATIONS

This patent application is co-pending with a related patent application Ser. No. 09/443,242.

STATEMENT OF GOVERNMENT INTEREST

The invention described herein may be manufactured and used by or for the Government of the United States of America for governmental purposes without the payment of any royalties theron or therefore.

BACKGROUND OF THE INVENTION (1) Field of the Invention

The present invention relates generally to communication systems, and more particularly to an adaptive modem for communication systems that utilizes multiple modulation and signal processing schemes to minimize detection, demodulation, and decoding errors while maximizing transmission data rates.

(2) Description of the Prior Art

Doppler and multipath are two well-known effects presented by communication channels. The doppler effect is characterized by an alteration of the transmitted signal frequency when there is relative movement between the transmitter and receiver. Alternately, multipath describes the multiple and time-delayed received signals resulting from a single transmission that travels multiple and varying length paths between the transmitter and receiver. U.S. Pat. No. 5,301,167 to Proakis et al. describes the ocean acoustic channel behavior and the resulting variant multipath that must be recognized as a basic channel characteristic. Proakis et al. describe an underwater acoustic communications apparatus using doppler removal, a specialized sample timing control technique, and decision feedback equalization to achieve high data rates for phase coherent modulation and demodulation. Proakis et al. present an apparatus in which digitized data streams are preceded by a synchronization signal and training sequence that are Phase-Shift-Keyed (PSK) modulated. This technique, although more efficient than other Frequency-Shift-Keying (FSK) techniques, provides a single transmit modulation and receive demodulation scheme regardless of channel characteristics. Experimentation with the FSK technique indicates communication difficulties even with a relatively high signal-to-noise ratio (SNR).

There is currently no apparatus that provides multiple modulation schemes to adapt the communication system to changing channel characteristics.

What is needed is an apparatus that provides multiple modulation schemes to provide communication system flexibility for changing communication channel characteristics.

SUMMARY OF THE INVENTION

It is a general purpose and object of the present invention to improve communication system error and transmission data rates. It is another object of the present invention to provide such improvement through an apparatus that contains multiple modulation schemes comprising modulation technique and encoder pairings, and corresponding multiple demodulation schemes comprising demodulation technique and decoder pairings.

Another object is to provide an apparatus to measure the communication channel's doppler and multipath characteristics. A further object is to estimate the communication channel's scattering function from doppler and multipath measurements and modem position estimates. Still another object of the present invention is to utilize such communication channel scattering function estimate, together with channel characteristic data, strategic information, and propagation models, to select the best available modulation scheme for the communication scenario.

Other objects and advantages of the present invention will become more obvious hereinafter in the specification and drawings.

These objects are accomplished with the present invention by an apparatus that uses multiple modulation schemes comprising modulation technique and encoder pairings. Corresponding demodulation technique and decoder combinations provide demodulation schemes that uniquely correspond to the modulation schemes. As communication system performance and objectives change, different modulation schemes may be selected. Modulation schemes may also be selected upon the communication channel scattering function estimate, and the apparatus estimates the channel scattering function from measurements of the channel's frequency (doppler) and time (multipath) spreading characteristics. An intelligence module measures the communication channel's doppler and multipath using a probe signal that is transmitted from a first modem to a second modem. Extrinsic data ports allow modem inputs for modem position estimates, channel characteristic data, strategic information, and propagation models to assist in scattering function estimation and modulation scheme selection. A coding module provides a modulation mode identifier to identify the modulation scheme. The second modem uses the modulation mode identifier to select the correct demodulation scheme. The intelligence module controls any probe signal transmission, scattering function estimate updating, and modulation scheme selection. The first and second modems are identically structured to allow bi-directional scattering function estimation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
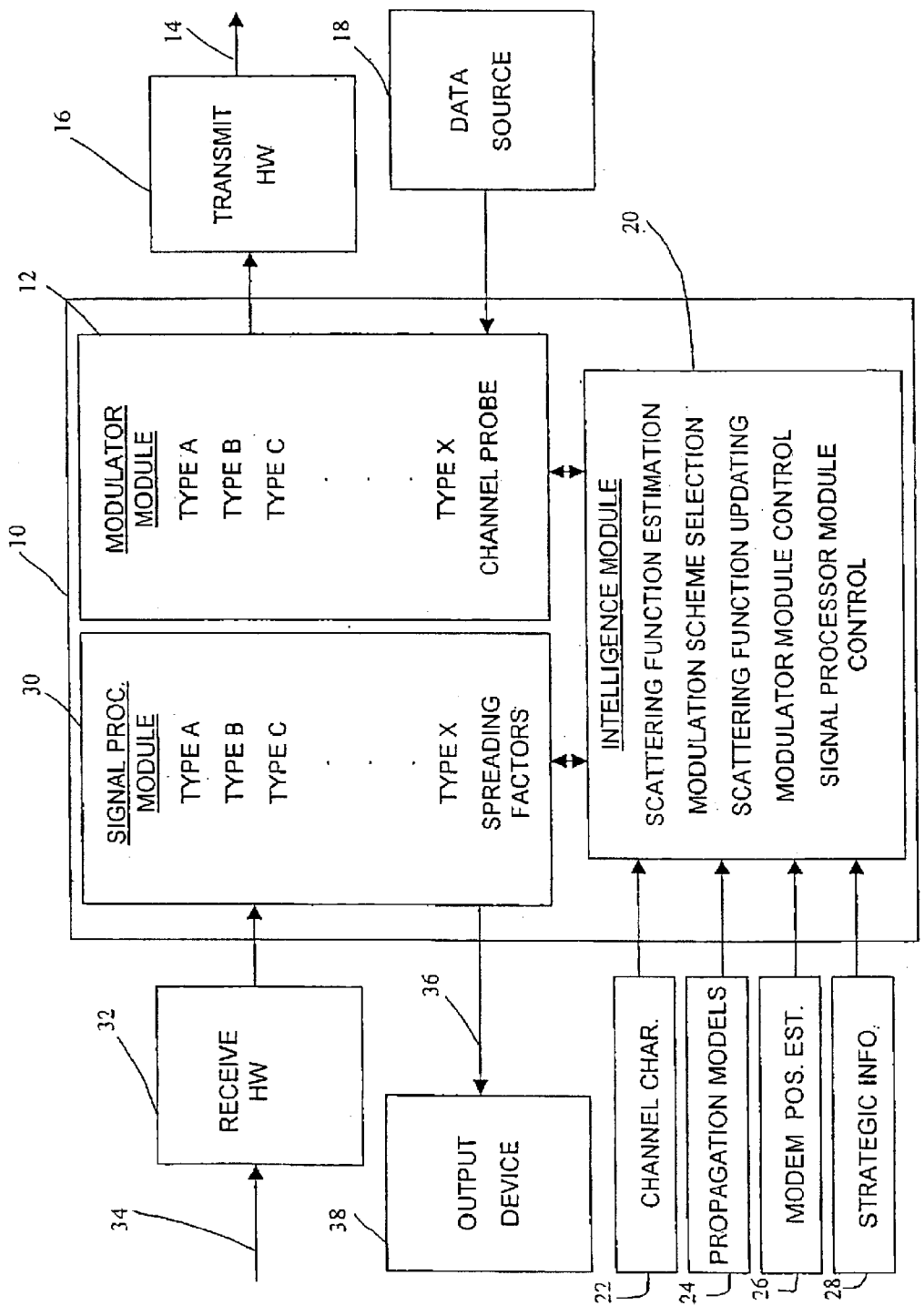
FIG. 1 is a block diagram of the adaptive modem paradigm.

Referring now to FIG. 1, there is shown a block diagram of the adaptive modem paradigm 10. Since the adaptive modem structure is identical for transmit and receive modems, adaptive modem modules shall be described while referring to FIG. 1 as though the FIG. 1 modem is performing both transmit and receive functions.

Each modem contains a modulator module 12 capable of multiple modulation schemes. A modulation scheme is comprised of a modulation technique and an encoder. Adaptive modem therefore comprises either multiple modulation techniques paired with at least one encoder, or at least one modulation technique paired with multiple encoders. Examples of modulation techniques include Frequency Shift Keying (FSK) and Phase Shift Keying (PSK). The maximum number of modulation schemes contained within modulator module 12 is equal to the number of different pairings of modulation techniques with encoders, or the number of modulation techniques multiplied by the number of encoders. Referring to FIG. 1, the modulation schemes are designated "Type A", "Type B", etc., to "Type X". Modulator module 12 must also be capable of selecting the channel probe signal. Modulator module 12 provides the encoded, modulated signal to external hardware 14 for transmission 16.

Modulator module 12 receives the data to be encoded, modulated, and transmitted from a modem external data source 18. Data source 18 may provide voice, text, image, or any other data type compatible with modem requirements. Modulator module 12 encodes and modulates data before transferring data to the transmission hardware 14. Additionally, modulator module 12 codes the encoded, modulated data with a modulation mode identifier to indicate the modulation scheme.

Modulator module 12 maintains modem internal input and output communications with the modem's intelligence module 20. Intelligence module 20 estimates the channel's scattering function and determines the modulation scheme to be used by modulator module 12. Intelligence module 20 additionally determines when modulator module 12 selects the channel probe signal. In the preferred embodiment, channel probing occurs prior to data transmission, and at subsequent intervals that may be fixed or based upon transmission error rate, signal-to-noise ratio, or other predefined criteria. Intelligence module 20 therefore provides modulator module 12 with modulation scheme, channel probe selection, and modulator module 12 initialization data. Alternately, modulator module 12 provides intelligence module 20 with current modulation scheme and modulator module 12 status data.

Intelligence module 20 estimates the channel scattering function using modem external inputs including channel characteristic data 22, propagation models 24, source and receiver position estimates 26, and strategic information 28. Channel characteristic data 22 includes any information characterizing the channel, and examples include oceanographic data or atmospheric data. Strategic information 28 is a general term for data regarding the goals or objectives for the transmission. Examples of strategic information 28 include the criteria for updating the scattering function (i.e., re-transmit the probe signal), desired SNR values or error rates before changing modulation schemes, limitations on specific modulation schemes, etc. The most significant component to intelligence module's 20 channel scattering function estimation is the modem internal input from a signal processor module 30 that contains the channel spreading factors. Signal processor module 30 derives the channel spreading factors from the received channel probe signal characteristics.

The modem internal interface between intelligence module 20 and signal processor module 30 is similar to that between intelligence module 20 and modulator module 12. Intelligence module 20 provides signal processor module 30 with signal processor module 30 initialization requirements. Signal processor module 30 provides intelligence module 20 with signal processor module 30 mode and status. Channel spreading factors computed by signal processor module 30 upon receipt of the channel probe signal are also communicated to intelligence module 20.

Signal processor module 30 is also responsible for interfacing with the receive hardware 32 that accepts the received signal 34, identifying the modulation scheme, selecting the corresponding demodulation scheme, and performing all demodulation and decoding functionality to reduce the data to its original form (i.e., voice, text, imagery, etc.). For each modulator module 12 modulation technique, signal processor module 30 maintains a corresponding demodulator technique. Similarly, for each modulator module 12 encoder, signal processor module 30 contains the decoder. Signal processor module 30 demodulation schemes comprise combinations of demodulation techniques and decoders, thereby producing a unique correspondence between modulator module 12 modulation schemes and signal processor module 30 demodulation schemes. Accordingly, signal processor module 30 demodulation schemes are designated in FIG. 1 as "Type A", "Type B", etc., to "Type X", just as modulator module 12 modulation schemes are designated. Signal processor module 30 uses the modulation mode identifier provided by modulator module 12 to select the correct demodulation scheme. Signal processor module 30 maintains a modem external interface 36 to transfer the demodulated, decoded data to the output device 38.

Figure 2:
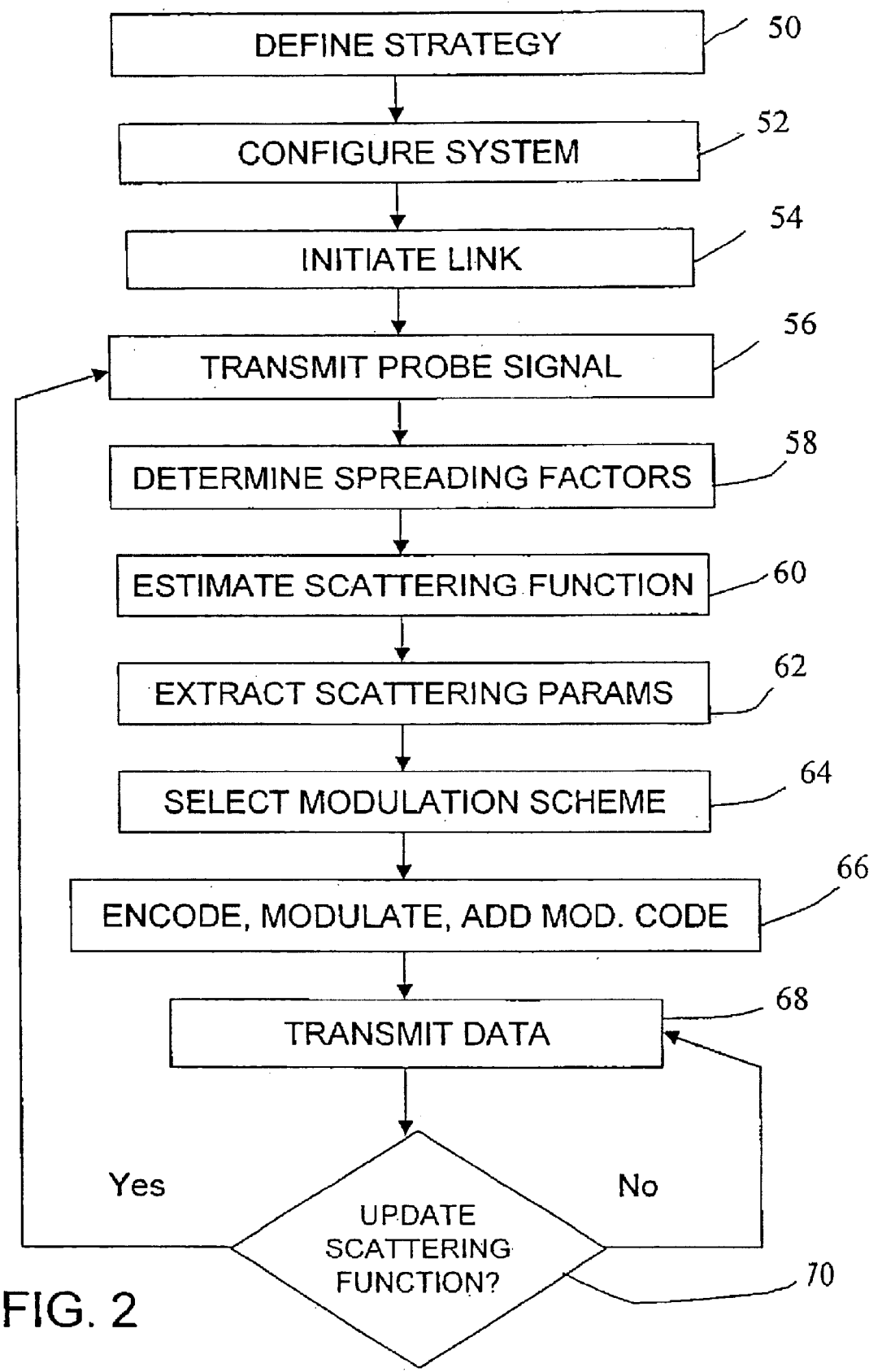
FIG. 2 is a block diagram of a communication system design using the adaptive modem.

Referring now to FIG. 2, there is shown a block diagram of the basic modem operation. The first step is to define a communication system strategy 50. The strategy includes modem configuration (initial modem locations; one transmit/one receive; one transmit/multiple receive, etc.), data transmission rates, performance measures (e.g., criteria to update the scattering function), available modulation techniques and encoders (i.e., modulation schemes), etc. Once the modems are configured 52 according to the strategy 50, a link 54 is established between a transmit modem and a receive modem. In the preferred embodiment, a transmit modem transmits to a distinct, identically configured receive modem, and for simplification, FIG. 2 shall be referenced as both transmit and receive modem, and FIG. 2 may therefore be extended to various configurations utilizing two or more modems. The transmit modem shall hereinafter be referred to as the first modem, and the receive modem shall be known as the second modem.

Once the link between first and second modem is established 54, first modem transmits the probe signal 56 to second modem. In the preferred embodiment, second modem's signal processing module determines the spreading factors 58 from the received probe signal, and passes the spreading factors to the intelligence module. The intelligence module estimates the channel scattering function 60 and extracts the scattering parameters 62 for transmission to first modem. First modem receives the scattering function parameters and first modem's intelligence module determines the modulation scheme 64 using the channel scattering function, channel characteristic data, strategic information, propagation models, and modem position estimates. First modem's modulator module encodes and modulates the data to be transmitted according to the selected modulation scheme, and codes the data with a modulation mode identifier 66 that indicates the modulation scheme. The coded modulated data is transmitted 68 and transmission continues until first modem's intelligence module issues a command to update the scattering function 70, whereupon, in the preferred embodiment, the probe signal is transmitted 56 to update the scattering function estimate. Once the scattering function is estimated with the update 60, 62, a modulation scheme is again selected 66, and data transmission 68 continues with the new modulation scheme.

In the preferred embodiment, all modems maintain the same structure, and therefore any modem may be configured to transmit or receive data. The channel scattering function may thus be estimated bidirectionally by transmitting the probe signal from both transmit and receive modems.

What has thus been described is an adaptive modem to improve communication system performance that uses multiple modulation schemes comprising modulation technique and encoder combinations. Corresponding demodulation technique and decoder combinations provide demodulation schemes that uniquely correspond to the modulation schemes. As communication system performance and objectives change, different modulation schemes may be selected. Modulation schemes may also be selected upon the communication channel scattering function estimate, and the modem estimates the channel scattering function from measurements of the channel's frequency (doppler) and time (multipath) spreading characteristics. An intelligence module measures the communication channel's doppler and multipath using a probe signal transmitted from a first modem to a second modem. Extrinsic data ports allow modem inputs for modem position estimates, channel characteristic data, strategic information, and propagation models to assist in scattering function estimation and modulation scheme selection. A coding module provides a modulation. mode identifier to identify the modulation scheme. The second modem uses the modulation mode identifier to select the correct demodulation scheme. The intelligence module controls any probe signal transmission, channel scattering function estimation updating, and modulation scheme selection.

Although the present invention has been described relative to a specific embodiment thereof, it is not so limited. Obviously many modifications and variations of the present invention may become apparent in light of the above teachings. For example, the criteria to update the scattering function estimate (i.e., re-transmit the probe signal) may be fixed or performance-based (e.g., SNR, error rate, etc.), and selection of a modulation scheme may be based upon criteria other than a channel scattering function. Embodiments utilizing the channel function estimation could include continual scattering function updating and modulation selection to eliminate multiple probe signal transmissions. The data transmission can be coherent or noncoherent. Probe signal characteristics may vary depending upon the communication channel to maximize the channel effects on the probe signal. The available modulation/demodulation techniques may be one providing the number of encoders/decoders is greater than one. Functionality may be otherwise divided amongst the modems, for example, allowing the receive modem to process the probe signal, generate the scattering function, select the modulation/demodulation technique, and then transmit merely the modulation technique to the transmit modem. Alternately, the receive modem could determine when the scattering function should be updated. Various means of identifying the modulation scheme (modulation mode identifier) may be used. Although the preferred embodiment presented strategic information, propagation models, and channel characteristic data as external modem inputs, this information is not so limited and could reside within the modem. The channel could be the ocean, atmosphere, or other channel. The preferred embodiment contained a signal processor module capable of multiple demodulation techniques, however the signal processor module could comprise multiple signal processors.

Many additional changes in the details, materials, steps and arrangement of parts, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A modem for communicating data through a channel, said modem comprising:
   a modulator interfaced to a transmission means, said modulator further comprising at least two distinct modulation schemes;
   a signal processor interfaced to a receiving means, said signal processor further comprising at least two distinct demodulation schemes, each of said at least two distinct demodulation schemes corresponding to said at least two distinct modulation schemes;
   said at least two modulation schemes further comprise one of at least two modulation techniques and one of at least one encoder;
   said at least two demodulation schemes further comprise one of at least two demodulation techniques and one of at least one decoder, said at least two demodulation techniques corresponding to said at least two modulation techniques, and said at least one decoder corresponding to said at least one encoder;
   said modulator is operable to produce a channel probe signal;
   an intelligence module, said intelligence module further comprising a modulator interface to transfer data between said intelligence module and said modulator, said transferred data comprising a modulation code to select one of said at least two distinct modulation schemes;
   a signal processor interface to transfer data between said intelligence module and said signal processor;
   a modulator control module to accept data from said modulator, transfer data to said modulator, and control said modulator;
   a signal processor control module to accept data from said signal processor, transfer data to said signal processor, and control said signal processor; and
   a channel estimation module.

2. The apparatus of claim 1 wherein said channel estimation module further comprises:
   a channel response module to process said received channel probe signal and generate time and frequency variation estimates of said received probe signal;
   a scattering estimation module to estimate a channel scattering function; and
   a modulation selection module to use said channel scattering function estimate to select one of said at least two modulation schemes, and set said modulation code for said modulator to select one of said at least two modulation schemes.

3. The apparatus of claim 2 wherein said scattering estimation module further comprises a channel update module to update said channel scattering function estimate.

4. The apparatus of claim 3 wherein:
   said scattering estimation module further comprises an extrinsic data interface to accept extrinsic data, said extrinsic data incorporated to estimate said channel scattering function; and
   said modulation selection module further comprises an extrinsic data interface to accept extrinsic data, said extrinsic data incorporated to select one of said at least two modulation schemes.

5. The apparatus of claim 4 wherein said extrinsic data comprises at least one input from the group comprising:
   channel characteristic data;
   propagation model data;
   position estimates of said at least two modems; and
   strategic data.

6. The apparatus of claim 5 wherein said channel characteristic data comprises oceanographic data.

7. The apparatus of claim 5 wherein said channel characteristic data comprises atmospheric data.

8. The apparatus of claim 5 wherein said strategic data comprises at least one input from the group comprising:
   signal-to-noise ratio thresholds;
   communication error-rate thresholds; and
   criteria to update said channel scattering function.

9. The apparatus of claim 3 wherein said, channel update module further comprises a channel probe signal indicator to indicate to said modulator to transmit said probe signals.

10. The apparatus of claim wherein:
    said modulator further comprises a modulation coding module to incorporate said modulation code with said data such that said modulated data indicates said selected one of at least two modulation schemes; and
    said signal processor further comprises a demodulation coding module to identify said modulation code and select one of said at least two de modulation schemes that corresponds to said modulation code.

11. A modem for communicating data through a channel, said modem comprising:
    a modulator interfaced to a transmission means, said modulator further comprising a plurality modulation schemes;
    a signal processor interfaced to a receiving means, said signal processor further comprising a plurality of demodulation schemes, each of said plurality of demodulation schemes corresponding to said plurality modulation schemes;
    said plurality of modulation schemes further comprise one of at least two modulation techniques;
    said plurality of demodulation schemes further comprise one of at least two demodulation techniques, said at least two demodulation techniques corresponding to said at least two modulation techniques;
    said plurality of modulation schemes further comprise one of at least two encoders; and
    said plurality of demodulation schemes further comprise one of at least two decoders, said at least two decoders corresponding to said at least two encoders.

12. The apparatus of claim 11 wherein:
    said modulator is operable for producing a channel probe signal.

13. The apparatus of claim 12 wherein said modem further comprises an intelligence module, said intelligence module further comprising:
    a modulator interface to transfer data between said intelligence module and said modulator, said
    transferred data comprising a modulation code to select one of said plurality of modulation schemes;
    a signal processor interface to transfer data between said intelligence module and said signal processor;
    a modulator control module to accept data from said modulator, transfer data to said modulator, and control said modulator;
    a signal processor control module to accept data from said signal processor, transfer data to said signal processor, and control said signal processor;
    a channel response module to process said received channel probe signal and generate time and frequency variation estimates of said received probe signal;
    a scattering estimation module to estimate a channel scattering function; and
    a modulation selection module to use said channel scattering function estimate to select one of said modulation schemes, and set said modulation code for said modulator to select one of said plurality of modulation schemes.

14. The apparatus of claim 13 wherein said scattering estimation module further comprises a channel update module to update said channel scattering function estimate.

15. The apparatus of claim 14 wherein:
    said scattering estimation module further comprises an extrinsic data interface to accept extrinsic data, said extrinsic data incorporated to estimate said channel scattering function; and
    said modulation selection module further comprises an extrinsic data interface to accept extrinsic data, said extrinsic data incorporated to select one of said plurality of modulation schemes.

16. The apparatus of claim 15 wherein said channel update module further comprises a channel probe signal indicator to indicate to said modulator to transmit said probe signal.

17. The apparatus of claim 13 wherein:
    said modulator further comprises a modulation coding module to incorporate said modulation code with said data such that said modulated data indicates said selected one of said plurality of modulation schemes; and
    said signal processor further comprises a demodulation coding module to identify said modulation code and select one of said plurality of demodulation schemes that corresponds to said modulation code.

18. A modem for communicating data through a channel wherein said channel has variable doppler and multipath effects, said modem comprising:
    a modulator interfaced to a transmission means, said modulator further comprising at least two distinct modulation schemes;
    a signal processor interfaced to a receiving means, said signal processor further comprising at least two distinct demodulation schemes, each of said at least two distinct demodulation schemes corresponding to said at least two distinct modulation schemes;
    said at least two modulation schemes further comprise one of at least two modulation techniques and one of at least one encoder;
    said at least two demodulation schemes further comprise one of at least two demodulation techniques and one of at least one decoder, said at least two demodulation techniques corresponding to said at least two modulation techniques, and said at least one decoder corresponding to said at least one encoder;
    said modulator is operable to produce a channel probe signal;
    said signal processor further comprises a channel probe signal processing module;
    an intelligence module, said intelligence module further comprising a modulator interface to transfer data between said intelligence module and said modulator, said transferred data comprising a modulation code to select one of said at least two distinct modulation schemes;

a channel response module to process said received channel probe signal and generate time and frequency variation estimates of said received probe signal;

a scattering estimation module to estimate a channel scattering function, said scattering estimation module further comprises a channel update module to regularly update said channel scattering function estimate; and a modulation selection module to use said channel scattering function estimate to select one of said at least two modulation schemes and set said modulations code for said modulator to select one of said at least two modulation schemes.

* * * * *